(12) United States Patent
Tomandl

(10) Patent No.: US 7,631,938 B2
(45) Date of Patent: Dec. 15, 2009

(54) STORED ENERGY CONTROL MECHANISM

(75) Inventor: Mark G. Tomandl, Cedar Springs, MI (US)

(73) Assignee: Grand Rapids Controls Company, LLC, Rockford, MI (US)

( * ) Notice: Subject to any disclaimer, the term of this patent is extended or adjusted under 35 U.S.C. 154(b) by 0 days.

(21) Appl. No.: 11/843,422

(22) Filed: Aug. 22, 2007

(65) Prior Publication Data

US 2008/0067851 A1 Mar. 20, 2008

Related U.S. Application Data

(60) Provisional application No. 60/839,217, filed on Aug. 22, 2006, provisional application No. 60/885,135, filed on Jan. 16, 2007.

(51) Int. Cl.
*B60N 2/10* (2006.01)

(52) U.S. Cl. ..................... 297/336; 297/326

(58) Field of Classification Search ........... 297/331, 297/332, 334, 335, 336, 325, 326, 316, DIG. 10, 297/340; 296/65.05, 65.15
See application file for complete search history.

(56) References Cited

U.S. PATENT DOCUMENTS

| 4,720,143 | A | * | 1/1988 | Schwartz et al. | 297/326 |
| 5,224,750 | A | * | 7/1993 | Clark et al. | 296/65.06 |
| 6,382,491 | B1 | * | 5/2002 | Hauser et al. | 296/65.05 |
| 6,932,409 | B2 | * | 8/2005 | Falchero et al. | 296/65.09 |

* cited by examiner

*Primary Examiner*—Milton Nelson, Jr.
(74) *Attorney, Agent, or Firm*—Price, Heneveld, Cooper, DeWitt & Litton, LLP

(57) ABSTRACT

An energy storage mechanism for folding seats for vehicles and the like includes an energy-storing component such as a spring that assists in moving the seat or other component. The mechanism provides for relatively small user input forces and distances, yet provides a relatively large force acting over a relatively large distance as an output of the mechanism. The mechanism may be configured to provide for a single user input/release, without requiring powered actuators or the like.

24 Claims, 13 Drawing Sheets

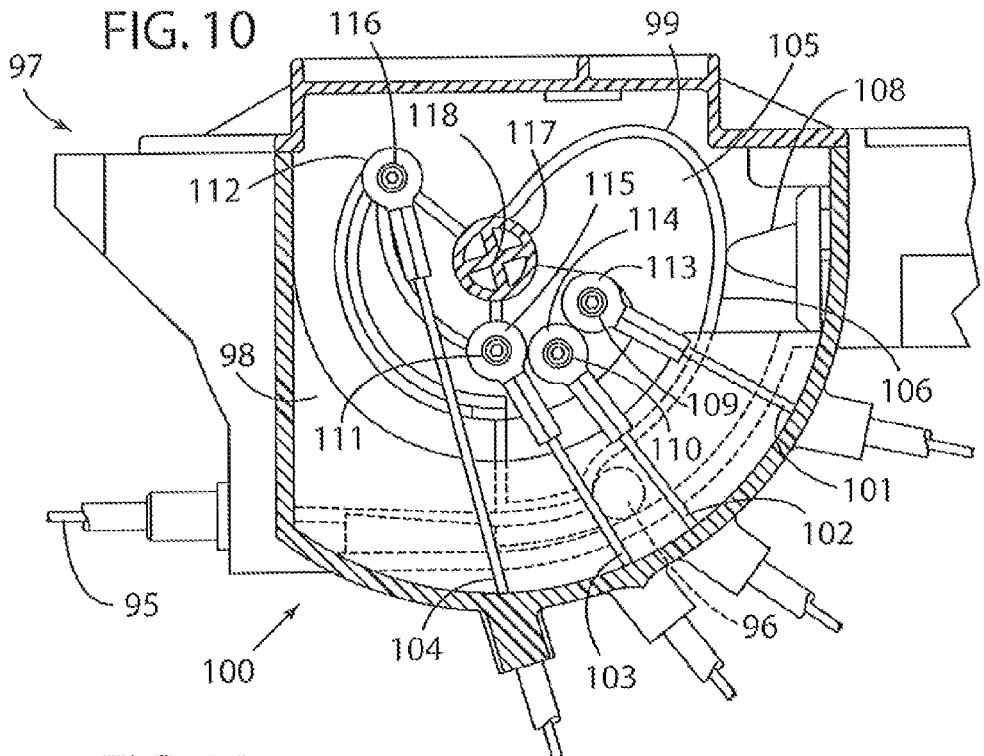
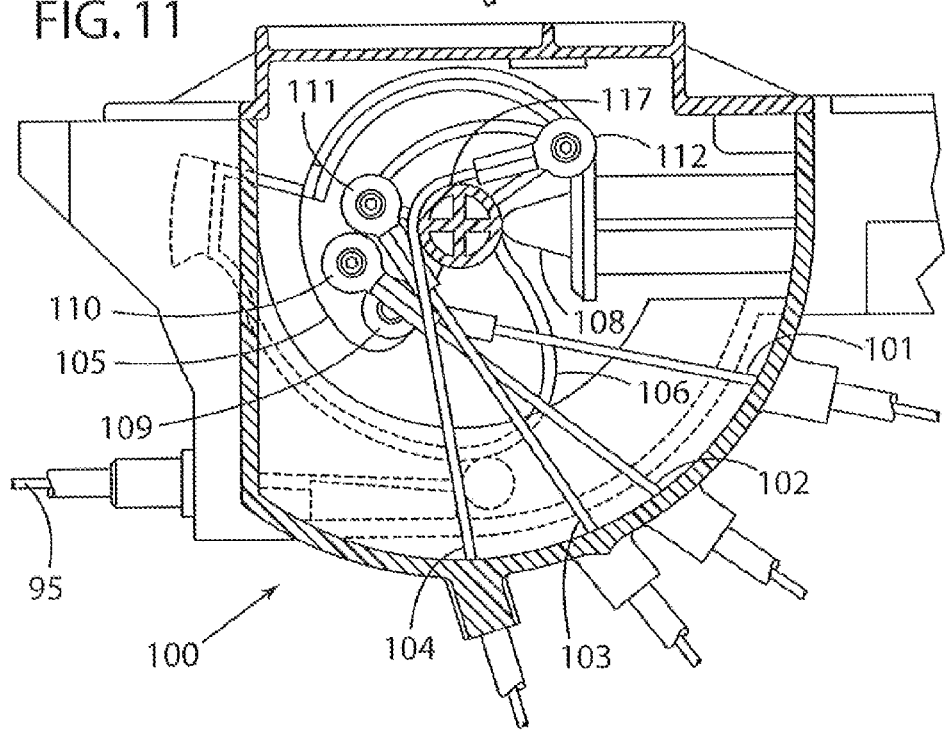

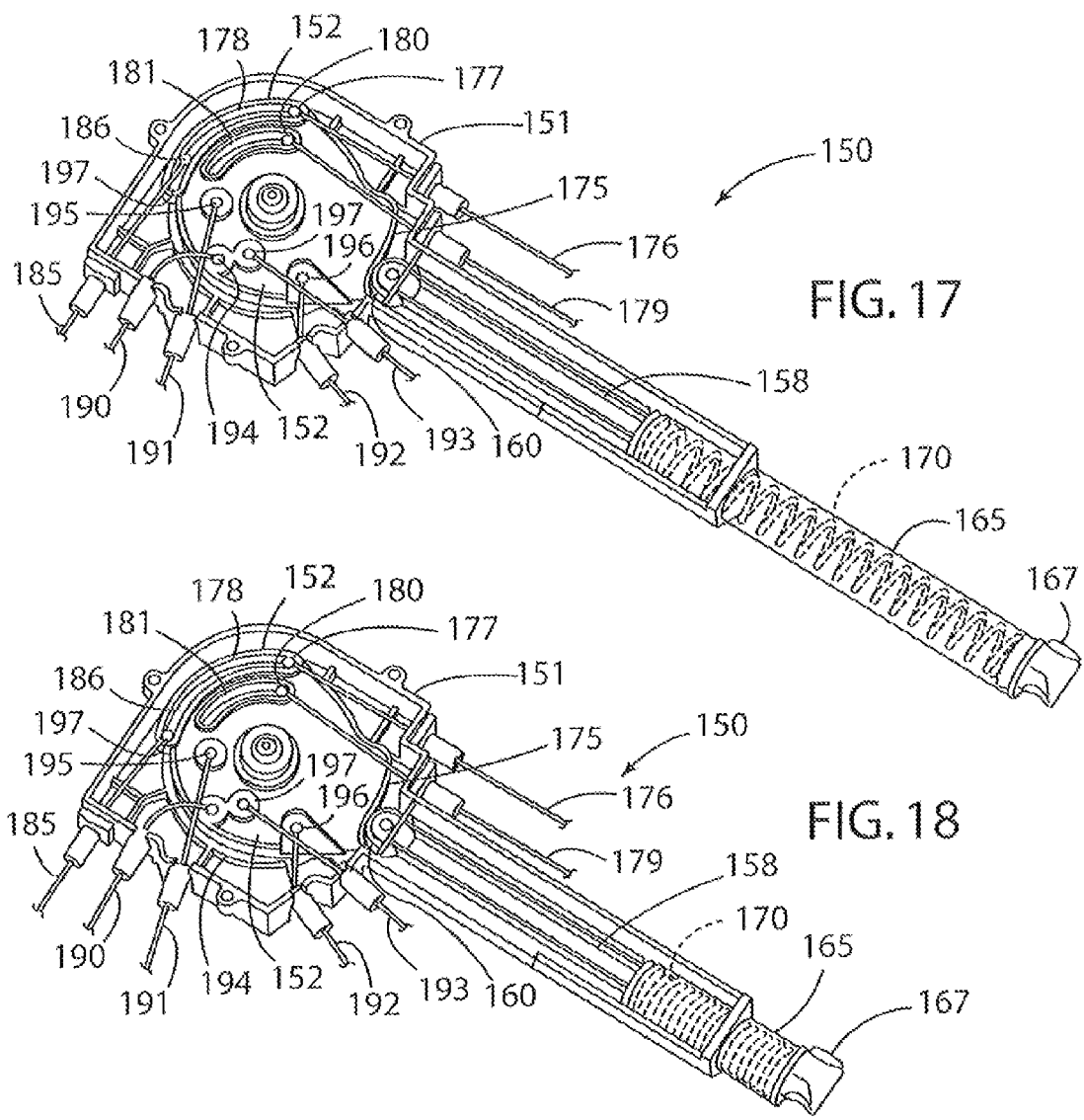

STORED ENERGY CONTROL MECHANISM

CROSS-REFERENCE TO RELATED APPLICATIONS

This application claims the benefit of U.S. Provisional Application No. 60/839,217, filed on Aug. 22, 2006, and U.S. Provisional Application No. 60/885,135, filed on Jan. 16, 2007, both entitled STORED ENERGY CONTROL MECHANISM, the entire contents of each of which are incorporated by reference.

BACKGROUND OF THE INVENTION

Various mechanisms for moving and/or folding seats for motor vehicles have been developed. One type of seat that may be used in Sport Utility Vehicles ("SUVs"), vans or the like includes one or more mechanisms that enable the seat back to be folded down, followed by upward and forward rotation of the seat back and base. Such seats provide for increased space for transporting large objects or the like when the rear seats of the vehicle are not needed.

Although such seats have been widely used due to the need for increased space, known mechanisms may not fully assist the user in folding the seat. Thus, known folding seat arrangements may require substantial input of force by a user to fold and/or unfold the seat.

Electrically-powered folding seats have also been developed, but the electrical actuators and related electrical components tend to be more costly than known mechanical mechanisms. Due to the added complexity, weight, and extra expense, powered folding seats have had somewhat limited acceptance in the marketplace.

SUMMARY OF THE INVENTION

The present invention relates to an energy storage mechanism that can be utilized to assist in folding a vehicle seat. The mechanism may be utilized in a wide range of other applications as well. The mechanism may include a cam that rotates to move cables that are, in turn, utilized to release a mechanism such as a latch, lock, or the like. The mechanism may be released by a relatively small user input force and movement such as movement of a release lever or the like, yet provide for a relatively large output force acting over a relatively large range of movement. If the mechanism is utilized to assist in movement of a vehicle seat to a folded position, the mechanism stores energy as the seat is folded downwardly to a use position, and releases the energy to assist in moving the seat from a use position to a folded position.

These and other features, advantages, and objects of the present invention will be further understood and appreciated by those skilled in the art by reference to the following specification, claims, and appended drawings.

BRIEF DESCRIPTION OF THE DRAWINGS

FIG. 10 is a partially fragmentary cross-sectional view of a portion of a mechanism according to another aspect of the present invention;

FIG. 11 is a partially fragmentary cross-sectional view of the mechanism of FIG. 10 showing the cam in a rotated position;

FIG. 17 is an isometric view of the energy storage mechanism of FIG. 16 wherein the mechanism is in an extended position;

FIG. 18 is an isometric view of the mechanism of FIG. 17 wherein the mechanism is in a retracted position;

DETAILED DESCRIPTION OF PREFERRED EMBODIMENT

Figure 3:
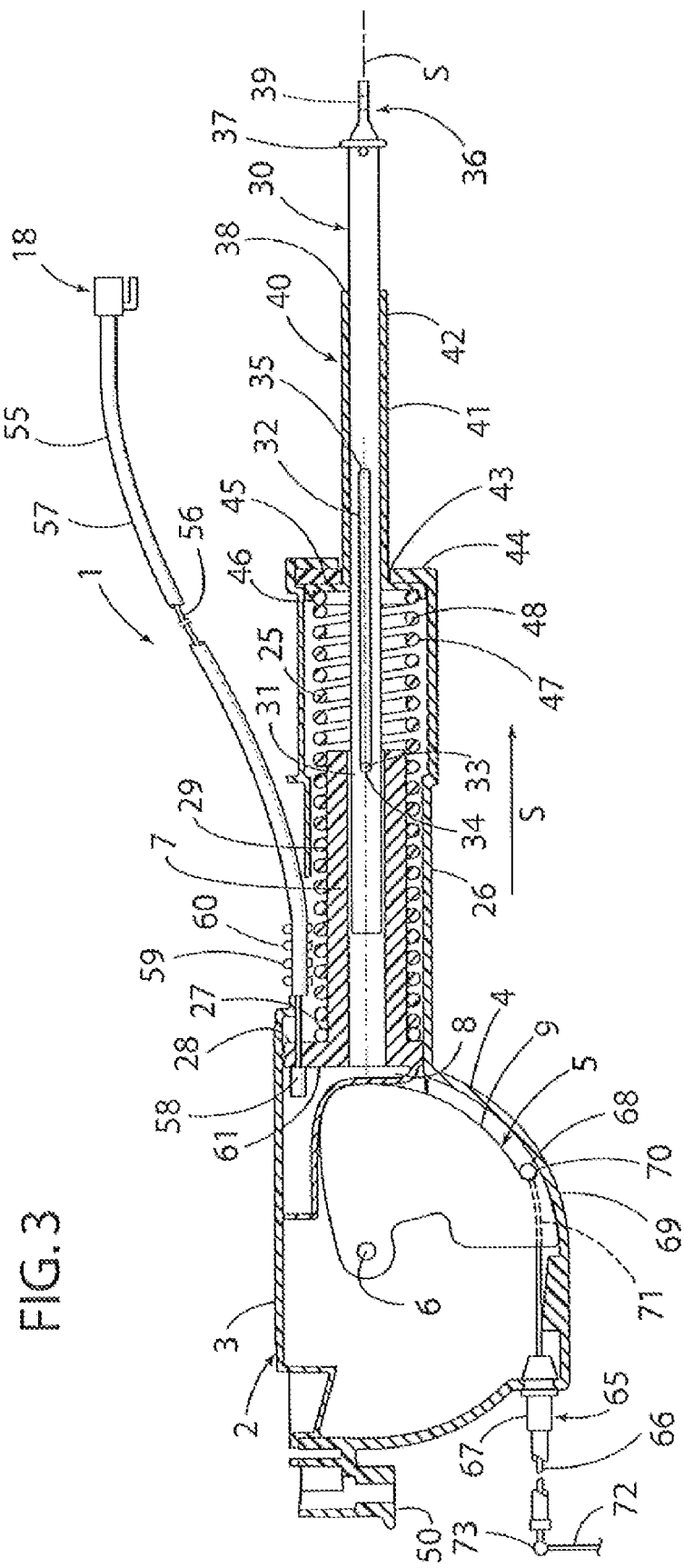
FIG. 3 is a cross-sectional view of an energy storage mechanism according to one aspect of the present invention.

For purposes of description herein, the terms "upper," "lower," "right," "left," "rear," "front," "vertical," "horizontal," and derivatives thereof shall relate to the invention as oriented in FIG. 3. However, it is to be understood that the invention may assume various alternative orientations and step sequences, except where expressly specified to the contrary. It is also to be understood that the specific devices and processes illustrated in the attached drawings and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
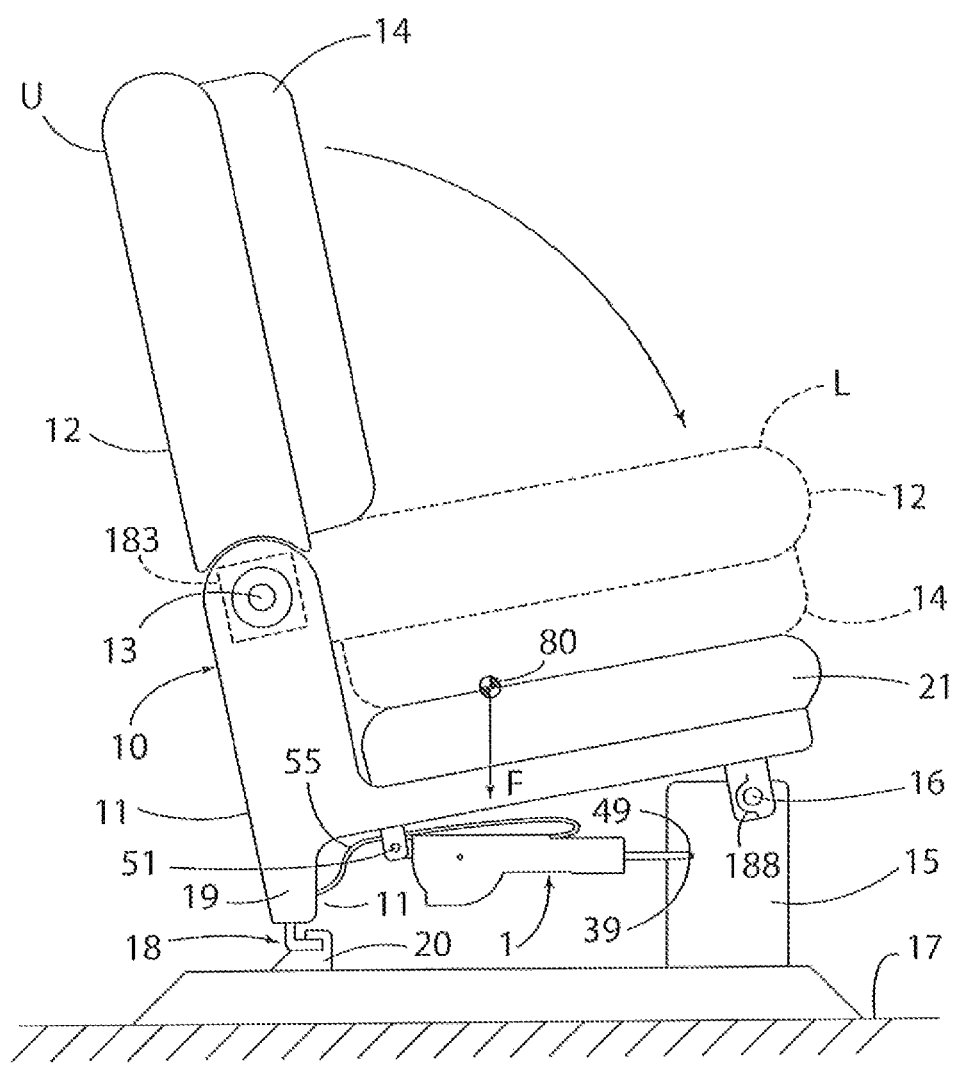
FIG. 1 is a partially schematic side view of a folding seat for vehicles and the like including an energy storage mechanism according to one aspect of the present invention.

With reference to FIG. 1, an energy storage mechanism 1 according to one aspect of the present invention may be mounted in a folding vehicle seat assembly 10. Mechanism 1 provides an axial force tending to move (rotate) the seat assembly 10 from the sue position of FIG. 1 to the folded position shown in FIG. 2, and also assists in moving the seat in a controlled manner from the folded configuration of FIG. 2 back to the use position of FIG. 1. As described in more detail below, energy storage mechanism 1 is capable of generating a force that assists a user in folding and unfolding the seat assembly 10, without requiring the use of powered actuators or the like.

Seat assembly 10 includes a seat base structure 11 and a seat back structure 12 that is pivotally mounted to the base structure 11 at a pivot 13. The seat back 12 and cushion 14 can be pivoted about pivot 13 from an upright position "U" to a lowered position "L". A seat cushion 21 is secured to the seat base structure 11. When the seat back structure 12 is folded forward, the back cushion 14 may contact the seat cushion 21 as shown in dashed lines in FIG. 1, and in solid lines in FIG. 2. Pivot 13 includes a pivoting/latching mechanism (not shown) of a known design that may be releasable to permit pivoting of the back 12 and cushion 14 from the upright position U.

Figure 2:
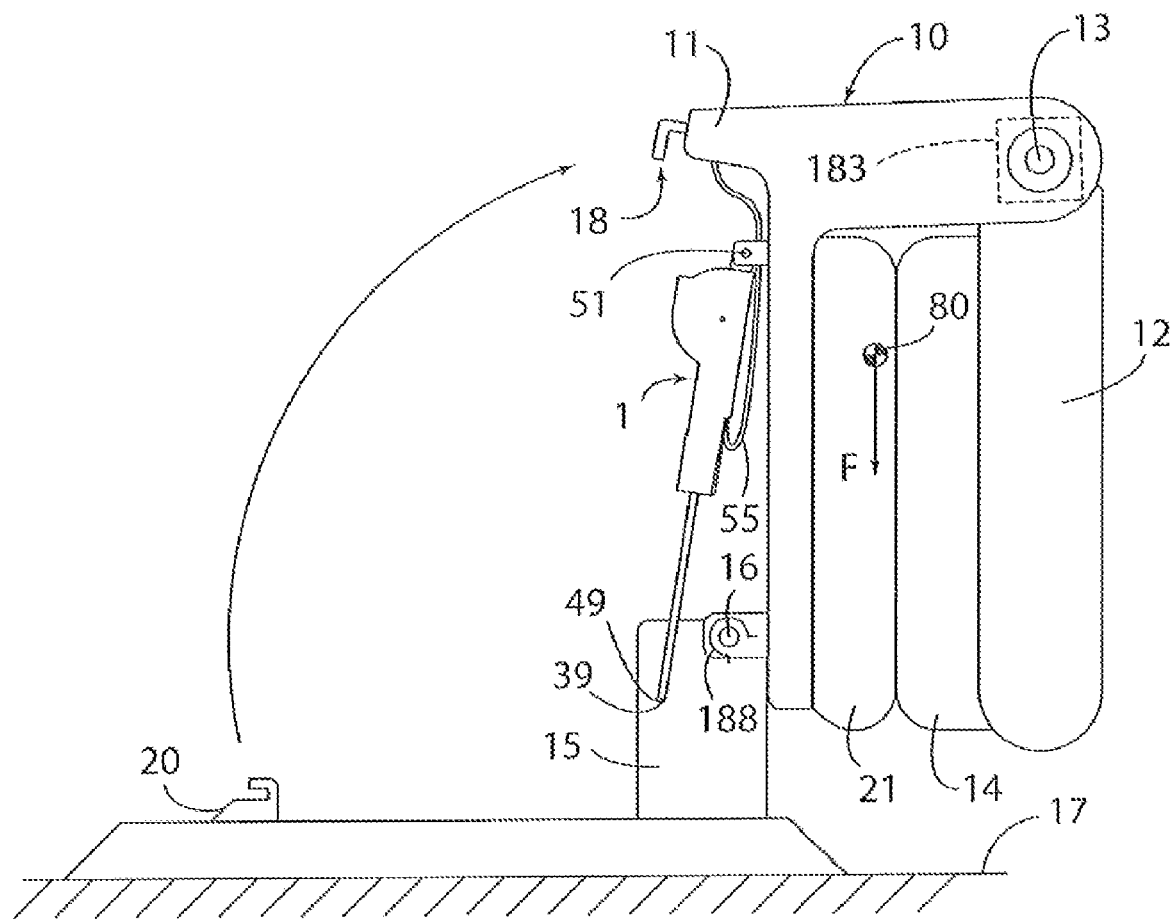
FIG. 2 is a partially schematic side view of the folding seat of FIG. 1 wherein the seat is in the folded configuration.

The seat base structure 11 is pivotable mounted to a fixed seat support bracket/structure 15 at pivot 16. The folding vehicle seat assembly 10 may include a torsion spring (not shown) of a known design acting about the pivot 16 tending to shift the seat from the use configuration of FIG. 1 to the folded configuration of FIG. 2. Prior folding seats included a pair of such torsion springs as well as dampening devices to control the rate of rotation of the seat as moving from position 1 to position 2. However, the energy storage mechanism 1 permits elimination of one or both of the torsion springs previously used at pivot 16 as well as any dampeners used to control the rate of rotation of the seat, thereby reducing the complexity and attending cost of the folding seat assembly 10. The fixed structure 15 is securely connected to vehicle floor structure 17. A releasable latch mechanism 18 securely yet releasably interconnects a rear portion 19 of seat base structure 11 to a fixed latch component 20 fixed to vehicle floor structure 17 to selectively prevent rotation of seat base 11 about pivot 16. The pivoting and latching mechanism 13 is connected to the latch mechanism 18 by a known device such as a rigid link, Bowden cable, or other suitable arrangement. As discussed in more detail below, the releasable latch mechanism 13 is operably connected to mechanism 1 by a cable assembly 55, and actuation (release) of mechanism 1 causes mechanism 1 to selectively release latch 13 to initiate the rotation of the back 12 and cushion 13 from position U to position L. Upon completion of this rotation the mechanism at pivot 13 then transmits the remaining energy from mechanism 1 to selectively release latch 18 to permit rotation of seat base 11 from the use position (FIG 1) to the folded configuration (FIG. 2). The releasable latch mechanisms 13 and 18 may be of a known design, such that they will not be described in detail herein.

With further reference to FIG. 3, an energy storage mechanism 1 according to one aspect of the present invention includes a housing 2 having a first part 3 that is interconnected to a second part 4 during assembly of the energy storage mechanism 1. A cam 5 is pivotally mounted in the housing 2 for rotation about a pivot 6. As described in more detail below, a first movable spring engagement part 7 includes a cam follower portion 8 that slidably contacts cam outer surface 9 to shift the first movable spring engagement part 7 along axis "S" upon rotation of cam 5.

A coil spring 25 is mounted within a cylindrical portion 26 of housing 2, and a first end 27 of coil spring 25 bears against an annular surface 28 of first movable spring engagement part 7. Coil spring 25 is coiled about a cylindrical portion 29 of first movable spring engagement part 7. It will be understood that other resilient members and/or devices such as gas springs or the like could be utilized instead of coil spring 25.

An elongated rod 30 is slidably received in a cylindrical bore 31 of first movable spring engagement part 7 for movement along axis S relative to first movable spring engagement part 7. A pin 33 is fixed to first movable spring engagement part 7, and extends transversely through elongated slot 32 in elongated rod 30. Pin 33 thereby limits the travel of elongated rod 30 relative to first movable spring engagement part 7. When the rod 30 is in the fully extended position relative to the first movable spring engagement part 7 (FIG. 3), pin 33 is in contact with a first end 34 of elongated slot 32 and prevents further extension of elongated rod 30. As described in more detail below, in operation, elongated rod 30 may be pushed inwardly into bore 31 of first movable spring engagement part 7, and contact between pin 33 and second end 35 of elongated slot 32 limits the travel of elongated rod 30 when it is pushed into bore 31 of first movable spring engagement part 7. Alternately, an annular flange or ridge 37 of rod 30 contacts end 38 of tubular portion 41 of a second movable spring part 40 to limit inward travel of rod 30 relative to part 40.

Second movable spring engagement part 40 includes elongated tubular portion 41 having a cylindrical bore 42 that slidably receives elongated rod 30. Tubular portion 41 of second movable spring engagement part 40 is slidably received in a aperture of opening 43 in an end piece 44 that is mounted to housing 2. The second movable spring engagement part 40 includes a disc-shaped end 45 disposed in a cylindrical cavity portion 47 of housing 2 in contact with second end 48 of coil spring 25. An annular flange 46 cups and locates end 48 of coil spring 25, and thereby ensures that the coil spring 25 bears against disc-shaped end 45 of second movable spring engagement part 40.

When the cam 5 of mechanism 1 is in the position illustrated in FIG. 3, the coil spring 25 bears against disc-shaped end 45 of second movable spring engagement part 40, thereby biasing the second movable spring engagement part 40 into the position illustrated in FIG. 3. In this position, the disc-shaped end 45 of second movable spring engagement part 40 bears against end piece 44, and end piece 44 acts as a stop that limits the outward travel of second movable spring engagement part 40 relative to housing 2. End 36 of elongated rod 30 further includes an opening 39 forming a connector that can be utilized to connect the elongated rod 30 to fixed structure 15 at a pivot point 49 (FIG. 1). Housing 2 further includes a connector 50 that pivotable mounts mechanism 1 to seat base 11 at pivot 51 (FIG. 1).

A first Bowden cable assembly 55 operably connects first movable spring engagement part 7 to latch mechanism 13. Cable assembly 55 includes an inner cable 56, and an outer tube or sheath 57. A fitting 59 secures end portion 60 of outer sheath 57 to the mechanism housing 2, and an end fitting 58 attached to inner cable 56 is secured to first movable spring engagement part 7 at a connector 61. As described in more detail below, movement of first movable spring engagement part 7 shifts the inner cable 56 of first Bowden cable assembly 55 to thereby selectively release the releasable latch mechanism 13.

A manual or electrical operating/release device such as lever 72 or the like is operably connected to mechanism 1 by a second Bowden cable assembly 65. Cable assembly 65 includes an inner cable 66, and a sheath 67. A first end fitting 68 is fixed to a first end 69 of inner cable 66. The end fitting 68 engages a stop surface 70 on cam 5 adjacent cam surface 9, and inner cable 66 passes through a slot 71 in cam 5 to form a lost motion mechanism. The slot 71 has a downwardly-opening U-shape in cross section, such that, in operation, the end fitting 68 and inner cable 66 can disengage completely from the cam 5 as can 5 rotates to the position shown in FIGS. 5 and 6. A second end 73 of inner cable 66 is connected to a release mechanism such as a lever 72 or the like that can be manipulated by a user to pull on inner cable 66.

Figure 4:
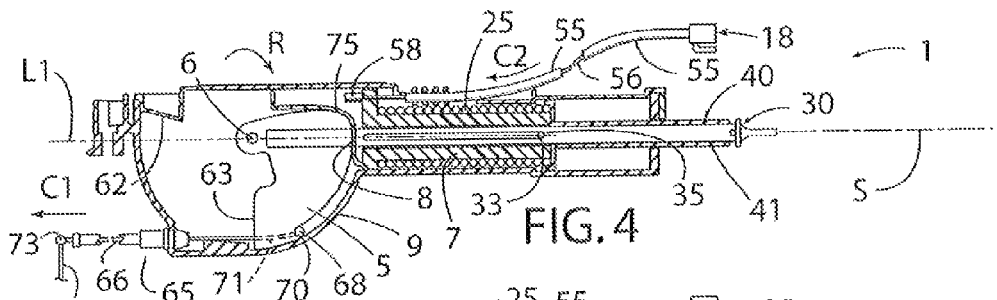
FIG. 4 is a cross-sectional view of the energy storage mechanism in a first position.

With further reference to FIG. 4, in use, a cycle starts with the mechanism 1 in the fully contracted position with elongated rod 30 fully inserted into tubular portion 41 of second movable spring engagement part 40. In this position, second movable spring engagement part 40 is shifted to the innermost position illustrated in FIG. 4, and cam 5 is in the forwardly-rotated position illustrated in FIG. 4. In this position, spring 25 is fully compressed (relative to the other operating states described in more detail below). The configuration of FIG. 4 corresponds to the seat position illustrated in FIG. 1, wherein the seat base structure 11 is in the lowered position, and latch mechanism 18 is engaged to secure the vehicle seat assembly 10 to the vehicle floor structure 17.

Figure 5:
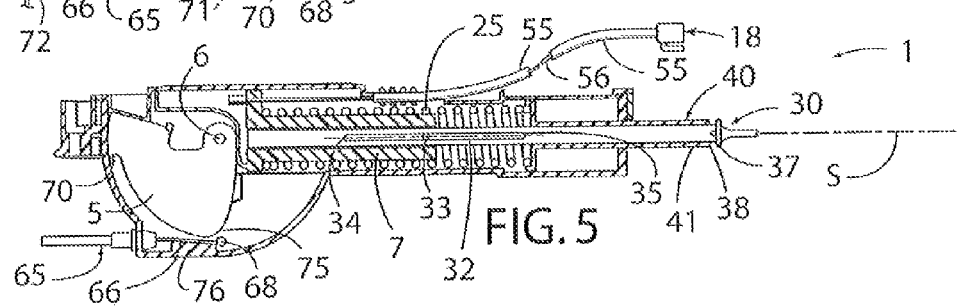
FIG. 5 is a cross-sectional view of the energy storage mechanism in a second position.

To fold the seat assembly 10 from the position illustrated in FIG. 1 to the position illustrated in FIG. 2, a suer actuates release mechanism 72 to shift inner cable 66 of second cable assembly 65 in the direction of the arrow "C1". Movement of cable 66 causes end fitting 58 to pull against stop surface 70 of cam 5, thereby causing cam 5 to begin rotating about axis 6 in the direction of the arrow "R". As the cam 5 rotates, the cam surface 9 slides against cam follower surface 8 of first moveable spring engagement part 7, with spring 25 biasing cam follower surface 8 into engagement with cam surface 9. As the cam 5 rotates in the direction of the arrow "R", the end portion or lobe 75 of cam 5 slides along cam follower surface 8 until the end portion 75 travels beyond a line "L1" passing through the pivot axis 6 of cam 5. Once the end portion 75 travels beyond the point L1, the contact point between cam follower surface 8 and cam surface 9 is offset below line L1, such that the force of coil spring 25 acting on cam 5 creates a moment tending to rotate the cam 5 in the direction of the arrow "R". The moment generated by coil spring 25 causes cam 5 to rotate as coil spring 25 expands until the cam 5 reaches the rearwardly-rotated position illustrated in FIG. 5. As discussed above, slot 71 in cam 5 has an outwardly-opening U-shape in cross section. This permits the cable end 68 and cable 66 to disengage from cam 5 as shown in FIG. 5, such that the cam 5 can rotate in the direction of the arrow "R" under the force of expanding coil spring 25 while inner cable 66 remains stationary. Housing 2 preferably includes a retainer portion 76 that retains the cable and fitting 66 in the position illustrated in FIG. 5 after it is disengaged from the stop surface 70 of cam 5. A stop surface 62 of housing 2 contacts side surface 63 of cam 5 to prevent rotation of cam 5 beyond the position of FIG. 5. As first movable spring engagement part 7 shifts relative to elongated rod 30, pin 33 of first movable spring engagement part 7 moves from second end 35 of slot 32 to a central portion of slot 32 as shown in FIG. 5.

As the first movable spring engagement part 7 shifts from the position illustrated in FIG. 4 to the position illustrated in FIG. 5, it pulls the end fitting 58 of inner cable member 56, thereby releasing the latch mechanisms 13 and 18. Release of the latch mechanism 18, in turn, permits the seat base structure 11 to be rotated upwardly from the position illustrated in FIG. 1 to the position illustrated in FIG. 2.

It will be appreciated that the mechanism 72 and cable 66 do not need to move very far to cause the cam 5 to release and thereby cause the first spring engagement part 7 to travel a relatively large distance as it moves from the position illustrated in FIG. 4 to the position illustrated in FIG. 5. Movement of first spring engagement part 7 thereby provides a relatively large input movement to releasable latch 18 via cable 55, even though the user may provide a relatively small movement at release device/lever 72. Also, the amount of force required to actuate device/lever 72 to rotate the cam 5 far enough to cause coil spring 25 to begin rotating the cam 5 is relatively low. Nevertheless, as the cam 5 rotates due to the force generated by coil spring 25, the force acting on inner cable 56 and latch 18 is quite large.

Figure 9:
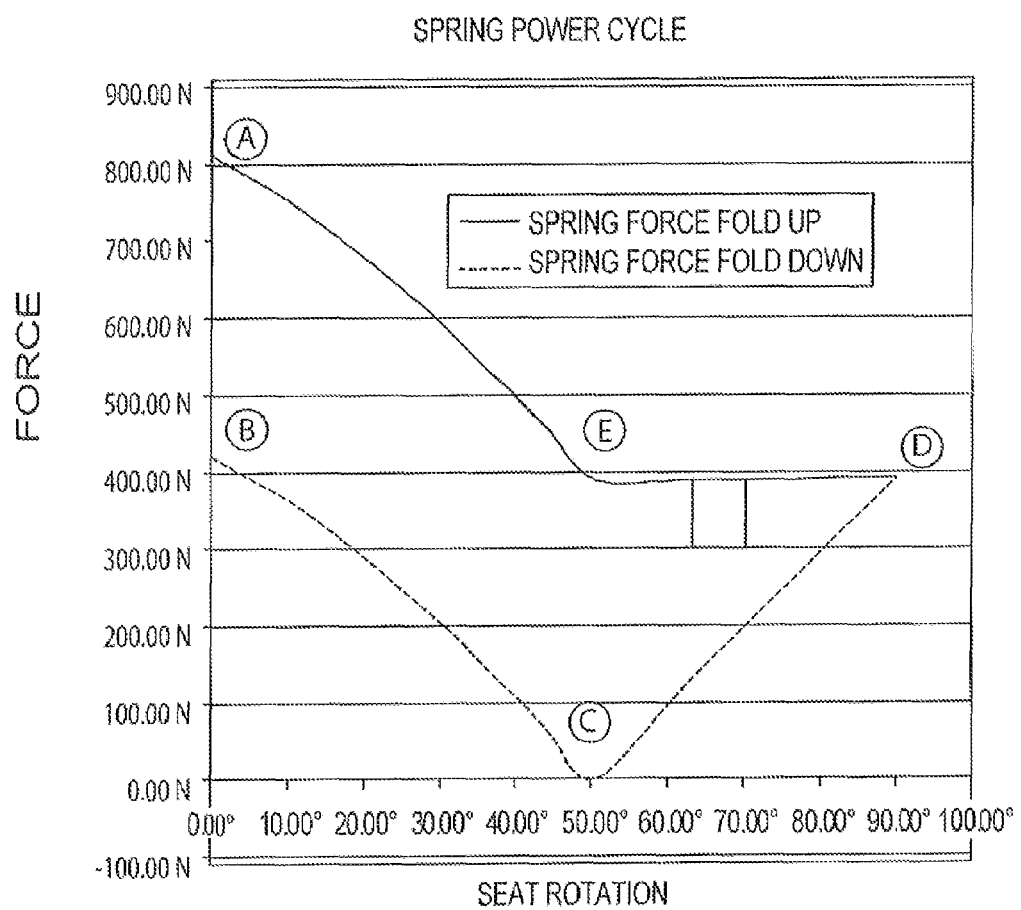
FIG. 9 is a graph showing the force generated by the energy storage mechanism.

With further reference to FIG. 9, as the mechanism shifts from the configuration of FIG. 4 ("circle A") to the configuration of FIG. 5 ("circle B"), the seat base 11 does not rotate. However, the amount of force generated by the coil spring 25 drops significantly due to the expansion of coil spring 25.

Figure 6:
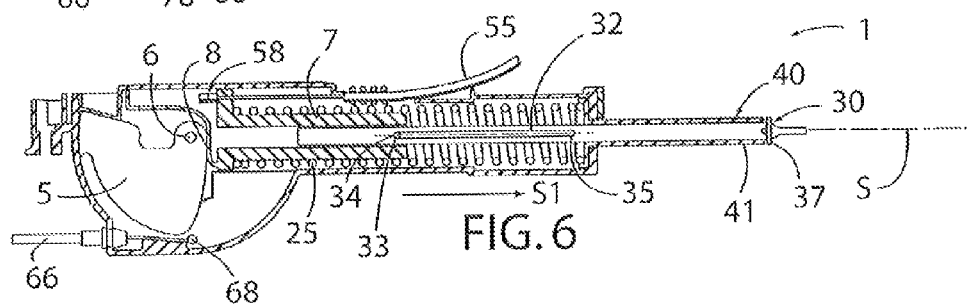
FIG. 6 is a cross-sectional view of the energy storage mechanism in a third position.

After the latch mechanism 18 is released, the mechanism 1 begins to assist upward rotation of seat base 11 by expanding length-wise as it shifts from the configuration illustrated in FIG. 5 to the configuration illustrated in FIG. 6. As the mechanism shifts from the configuration of FIG. 5 to the configuration of FIG. 6, the second movable spring engagement part 40 is shifted outwardly as coil spring 25 expands, and the seat base 11 rotates upwardly. As second movable spring engagement member 40 moves outwardly from the position of FIG. 5 to the position of FIG. 6, end 38 of part 40 bears against annular ridge 37 of rod 30, and thereby pushes rod 30 outwardly. Movement of rod 30 relative to first spring engagement part 7 causes pin 33 of part 7 to shift from a central portion of elongated slot 32 as shown in FIG. 5 to the end 34 of slot 32 shown in FIG. 6. With reference to FIG. 9, when the mechanism 1 is in the configuration illustrated in FIG. 6 ("circle C"), the coil spring 25 is fully extended, and the coil spring 25 does not generate force tending to further rotate the seat base 11. At this point, the seat base 11 is at a rotation angle of about fifty degrees relative to the use position of zero degrees (FIG. 1). At about mid rotation, the center of gravity 80 (FIGS. 1 and 2) of the moving portion (i.e., base 11 and back 12) of the seat assembly passes over the pivot point 16, such that the seat base 11 and back 12 will tend to continue moving toward the folded position of FIG. 2 due to the moment generated due to the center of gravity being forward of the pivot point 16. Also, as the seat base 11 and back 12 are moved from the use configuration (FIG. 1) to the folded configuration (FIG. 2), the momentum of the moving components will tend to cause the parts to continue moving even after mechanism 1 is not generating a force on seat base 11. As the center of gravity passes over the pivot point 16, the momentum of the seat assembly will therefore tend to continue the rotation of the moving seat components. Thus, the combined effects of the moment caused by the position of the center of gravity and the momentum of the components tends to cause the seat to rotate to the fully folded position of FIG. 2.

Figure 7:
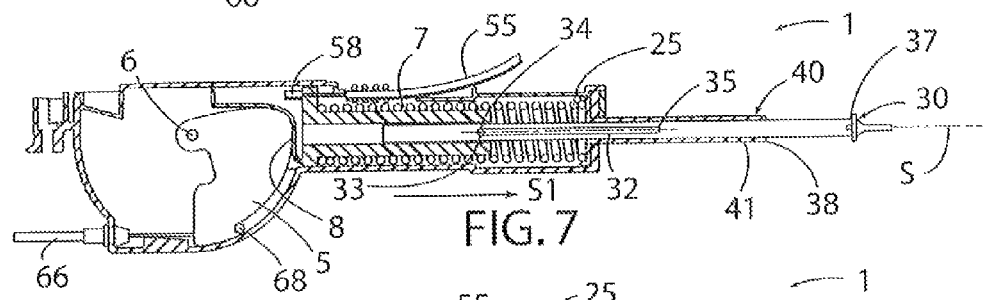
FIG. 7 is a cross-sectional view of the energy storage mechanism is a fourth position.

As the seat base 11 continues to rotate past fifty degrees relative to the starting position, the mechanism 1 shifts from the configuration illustrated in FIG. 6 to the configuration illustrated in FIG. 7. During this portion of the operation, the elongated rod 30 is pulled out of the elongated tubular portion 41 of second movable spring engagement part 40, and the pin 33 pulls the first movable spring engagement part 7 outwardly due to contact of pin 33 with the second end 35 of elongated slot 32 in elongated rod 30. Movement of the first movable spring engagement part 7 causes the cam follower surface 8 to move in the direction of the arrow "S1" along axis S. A torsion spring (not shown) biases the cam 5 in a counterclockwise direction (i.e., opposite the arrow "R") (FIG. 4). As the cam follower surface 8 moves in the direction of the arrow "S", the cam 5 rotates from the rearward position shown in FIG. 6 to the forward position shown in FIG. 7. As the coil spring 25 is compressed, the force generated by the coil spring 25 shifts from zero ("circle C") (FIG. 9) to the "circle D" position of FIG. 9.

As discussed above, the moving seat components 11 and 12 have stored energy due to the momentum initially generated by expansion of coil spring 25 in moving from the configuration of FIG. 5 to the configuration of FIG. 6, and the seat also generates a moment about pivot 16 (FIG 2.) because the center of gravity 80 is forward of the pivot 16. The combination of the moment due to the center of gravity 80 being forward of pivot 16, and the energy stored in the moving seat components compress the coil spring 25 as the mechanism shifts from the configuration of FIG. 6 to the configuration of FIG. 7. In this way, the mechanism 1 again stores some of the energy by compressing coil spring 25 as the seat reaches the fully folded position illustrated in FIG. 2. It will be apparent that the energy stored by spring 25 as it is compressed during the final portion of the movement to the position of FIG. 2 acts as a cushion to slow the rotation of the seat components just prior to reaching the folded configuration.

To shift the seat from the fully folded position illustrated in FIG. 2, wherein the mechanism 1 is in the configuration illustrated in FIG. 7, a user pulls on the seat to rotate it about the pivot axis 16. Initially, the mechanism 1 shifts from the configuration illustrated in FIG. 7 to the configuration illustrated in FIG. 8 due to the elongated rod 30 sliding into the cylindrical portion 41 of second movable spring engagement part 40. During this movement, pin 33 slides from end 34 of slot 32 (FIG. 7) to a central portion of slot 32 (FIG. 4). The force required to slide elongated member 30 in tubular portion 41 of second movable spring engagement part 40 may be controlled to provide the desired degree of resistance. For example, the force may be controlled by providing a tight or loose fit between the elongated rod 30 and the elongated portion 41 and by controlling the frictional coefficients of the materials used. Also, the force generated during motion of elongated rod 30 relative to the cylindrical portion 41 may include a damping component. The damping component may be due to (for example) air moving between the elongated rod 30 and the cylindrical portion 41. Thus, the force required to move elongated rod 30 relative to cylindrical portion 41 of second movable spring engagement part 40 may include a frictional component that is an approximately constant force, and it may also include a component that is a linear (or non-linear) function of velocity to provide damping.

Figure 8:
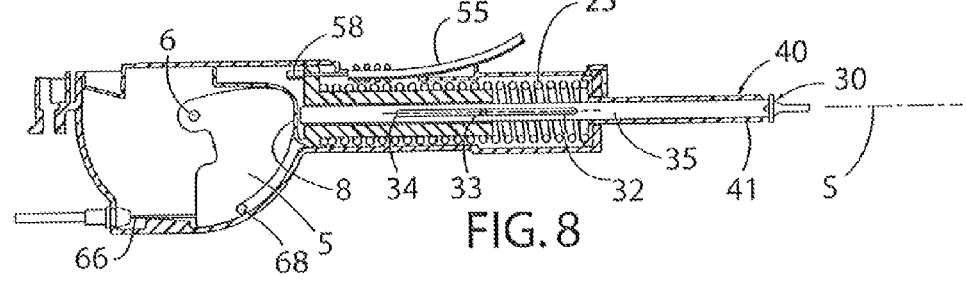
FIG. 8 is a cross-sectional view of the energy storage mechanism in a fifth position.

A the seat assembly moves from the configuration of FIG. 2 to the configuration of FIG. 1, the elongated rod 30 reaches the position illustrated in FIG. 8, and the flange 37 of elongated rod 30 bears against end 38 of cylindrical portion 41. The second movable spring engagement part 40 then moves from the configuration illustrated in FIG. 8 to the configuration in FIG. 4, thereby compressing coil spring 25. As rod 30 moves relative to part 7, pin 33 moves from a central portion of slot 32 (FIG. 8) of rod 30 to end 35 of slot 32 (FIG 4). Once the seat assembly returns to the position illustrated in FIG. 1, the coil spring 25 is fully compressed as illustrated in FIG. 4. At this point, a user can repeat the cycle by releasing the cam 5 by manipulating release mechanism 72 as described above.

With further reference to FIGS. 10 and 11, a mechanism 100 according to another aspect of the present invention is similar to the energy storage mechanism 1 described above, except that the mechanism 100 includes an arrangement whereby one or more cables 101 are connected directly to a cam 105, rather than to a component such as the first movable spring engagement part 7 that moves with a cam follower. Cam 105 of mechanism 100 includes a cam surface 106 that is cycloidal in shape. A cam follower 108 slidably engages the cam surface 106 to compress a spring (not shown) in substantially the same manner as the spring 25 discussed in detail above in connection with the mechanism 1. Although cam surface 106 could have a variety of shapes, a cycloidal shape is presently preferred because the rate of change of the radius defined by the cam surface 106 is somewhat lower than the cam surface 9 of mechanism 1, and the cam 105 therefore does not release as rapidly, such that the noise and vibration upon actuation of the mechanism is reduced. Cam 105 includes raised bosses 109, 110, 111 and 112. An end fitting 113 connects cable 101 to boss 109, and an end fitting 114 interconnects cable 102 to boss 110. Similarly, a fitting 111 connects cable 103 to boss 111, and a fitting 116 connects cable 104 to boss 112.

An end 96 of a release cable 95 is operably interconnected to cam 105 by a lost motion mechanism that is substantially similar to the arrangement described in detail above in connection with the mechanism 1 (FIG. 3). Housing 97 of mechanism 100 includes a wall portion 98 that separates the end portion and end fitting 96 of cable 95 from the cables 101-104.

In use, a user generates a force on cable 95 tending to rotate the cam 105 in a clockwise direction from the position illustrated in FIG. 10. As the cam follower 108 passes over the end lobe surface 99 of cam 105, the force generated by the main spring (not shown) causes the cam follower 108 to rotate the cam 105 in a clockwise direction from the position illustrated in FIG. 10 to the position illustrated in FIG. 11. As the cam 105 rotates, it pulls on the cables 101-104, thereby actuating a plurality of mechanisms. Also, cam 105 includes a hub 117, and one or more of the cables 101-104 wrap around the hub 117 as the cam 105 rotates to the position illustrated in FIG. 11 to thereby ensure that the cables 101-104 are pulled the desired distance. The raised bosses 109-112 may be positioned at different heights along axis 118 of cam 105 to ensure that the cables 101-104 pass over one another when the cam 105 rotates to the position illustrated in FIG. 11.

The mechanism 100 provides for four different outputs, such that the mechanism 100 can actuate four separate latch mechanisms or the like. In the illustrated example, the cables 101 and 102 are each connected to a main latch 18 (FIG. 1), and the cable 103 is operably connected to a latch 13 to release the seat back 12 relative to the base 11. The cable 104 is operably connected to a latch mechanism of a folding headrest (not shown). Such folding headrests and latch mechanisms are known, such that the details of the headrest and headrest mechanism are not described in detail herein.

The position of the bosses 109-112 can be selected to provide the desired amount of travel and force on the cables 101-104 as required to actuate the specific mechanism connected to each of the cables 101-104. Furthermore, the position of the bosses 109-112 also controls the timing of the actuation of the mechanisms connected to the cables 101-104. In the illustrated example, the cables 101 and 102 are both connected to latch mechanisms 18 that secure the seat to the vehicle floor. The cables 101 and 102 actuate the latch mechanisms 18 at virtually the same time. The position of boss 112 is selected to cause cable 104 to actuate the headrest latch mechanism (not shown) quickly, such that the headrest latch is released before the latches 18. The boss 111 is positioned to pull on cable 103 and actuate a latch mechanism at pivot 13 (FIG. 1) immediately after the headrest latch mechanism is actuated, but prior to actuation of the latches 18.

Although mechanism 100 is illustrated as including four bosses that operably connect four different cables to the mechanism 100, the number of cables operably connected to the cam 105 may be varied for a particular application as required to actuate the number of latches utilized in a particular seat design.

Figure 12:
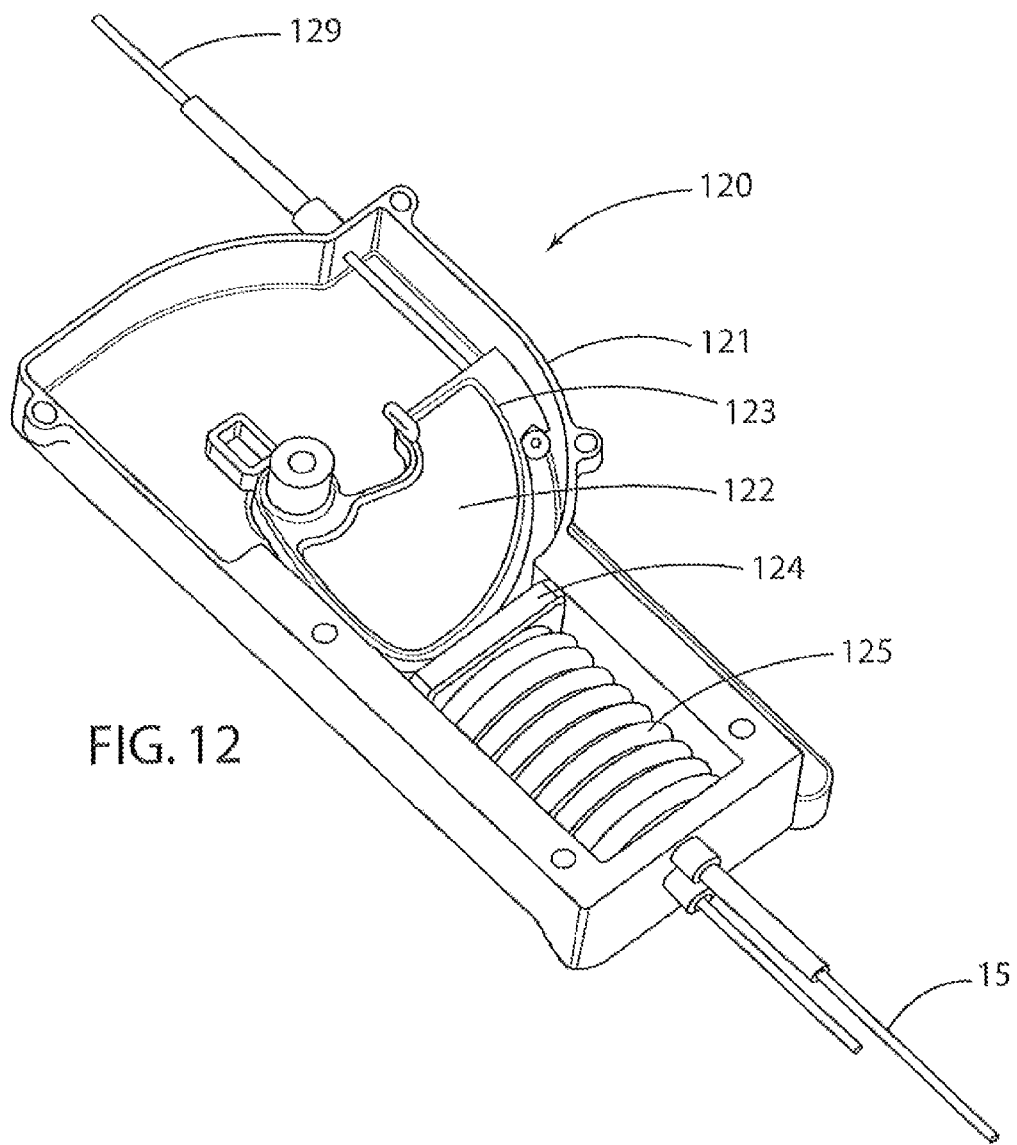
FIG. 12 is an isometric view of an energy storage mechanism according to another aspect of the present invention.
Figure 13:
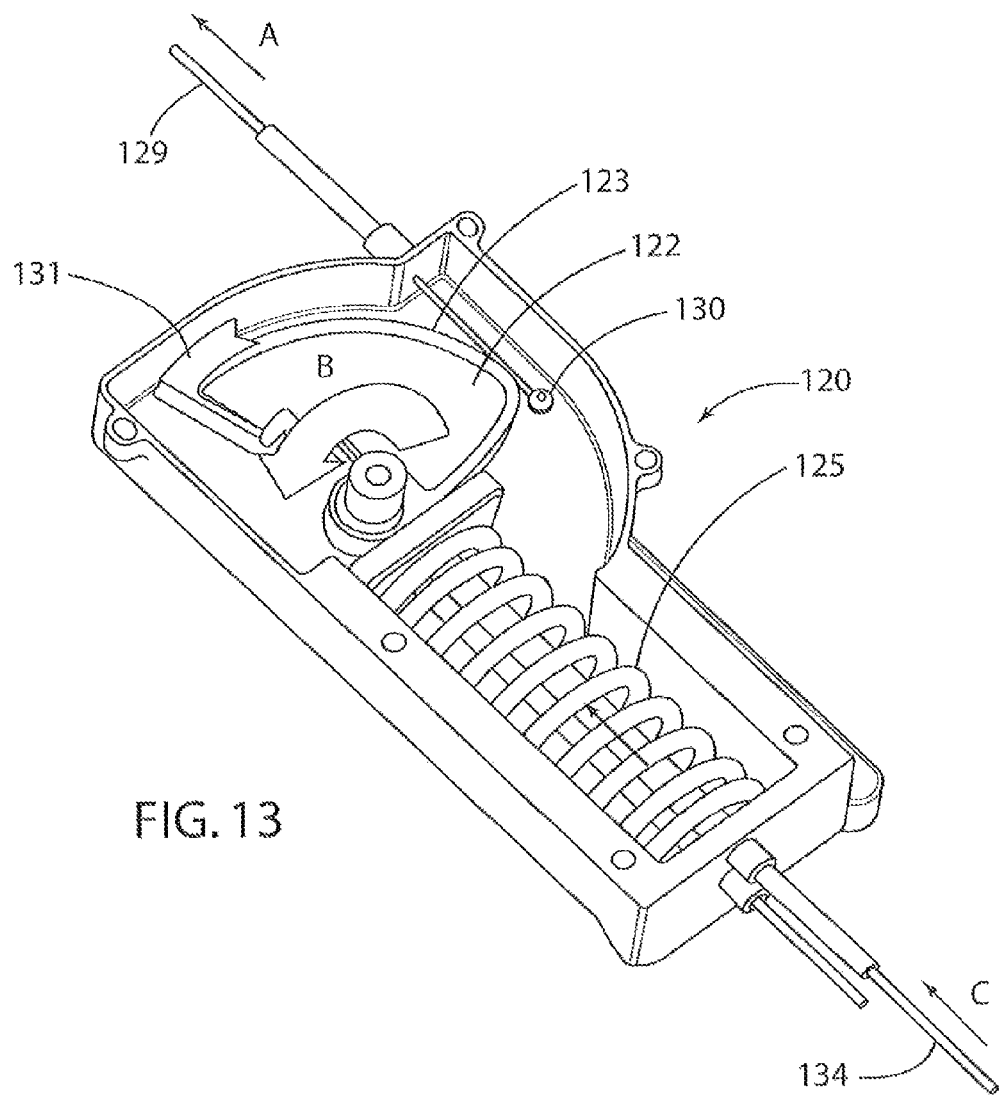
FIG. 13 is an isometric view of the mechanism of FIG. 12.

With further reference to FIG. 12, a mechanism 120 according to another aspect of the present invention includes a housing 121 that pivotable supports a cam 122 defining a cam surface 123 that slidably engages a cam follower 124 that is connected to a coil spring 125. An input cable 129 is operably connected to the cam 122, and rotates the cam 122 in the directions of the arrow B when the input cable 129 is shifted in the direction of the arrow A. In operation, input cable 129 is shifted in the direction of the arrow A, and a "lost motion" interconnection formed by retainer 131 of cam 122 and ball end 130 of cable 129 initially rotates cam 122 through a few degrees of motion from the position illustrated in FIG. 12 as a result of the force of ball end 130 acting on retainer 131 of cam 122. However, after the cam 122 rotates past a few degrees, the action of spring 125 and cam follower 124 on cam surface 123 generates a force on cam 122 causing the cam 122 to rotate in the direction of the arrow B without further movement of ball end 130. As shown in FIG. 13, retainer 131 of cam 122 disconnects from ball end 130 after a few degrees of rotation thereby providing a lost motion interconnection.

The input cable 129 may be actuated manually by a strap, lever, or other manual input device that is positioned to be readily accessible to a user. Alternately, a powered actuator such as a solenoid, electric motor, or the like may also be operably connected to the cable 129 to shift cable 129 and thereby actuate mechanism 120.

Significantly, input cable 129/ball end 130 may move a relatively short distance (e.g., 10 mm), and a relatively small amount of force (e.g., 15-50 Newtons) on cable 129 may be sufficient to cause the cam 122 to shift from the position illustrated in FIG. 12 to the position illustrated in FIG. 13. However, as the spring 125 moves from the compressed position shown in FIG. 12 to the extended position shown in FIG. 13, spring 125 causes output cable 134 to travel a distance in the direction of the arrow C by an amount (e.g., 50 mm) that is substantially greater than that of input cable 129, and also produce a force (e.g., 600-1200 Newtons) that is substantially greater than the force needed to move the input cable 129. Thus, the input forces and/or distances utilized to control/actuate mechanism 120 or substantially less than the output forces and/or distances provided by mechanism 120. Also, the mechanism 120 can be designed to accommodate a wide range of travel requirements and force requirements for the output cable 134 without changing the design of mechanism 120.

Figure 14:
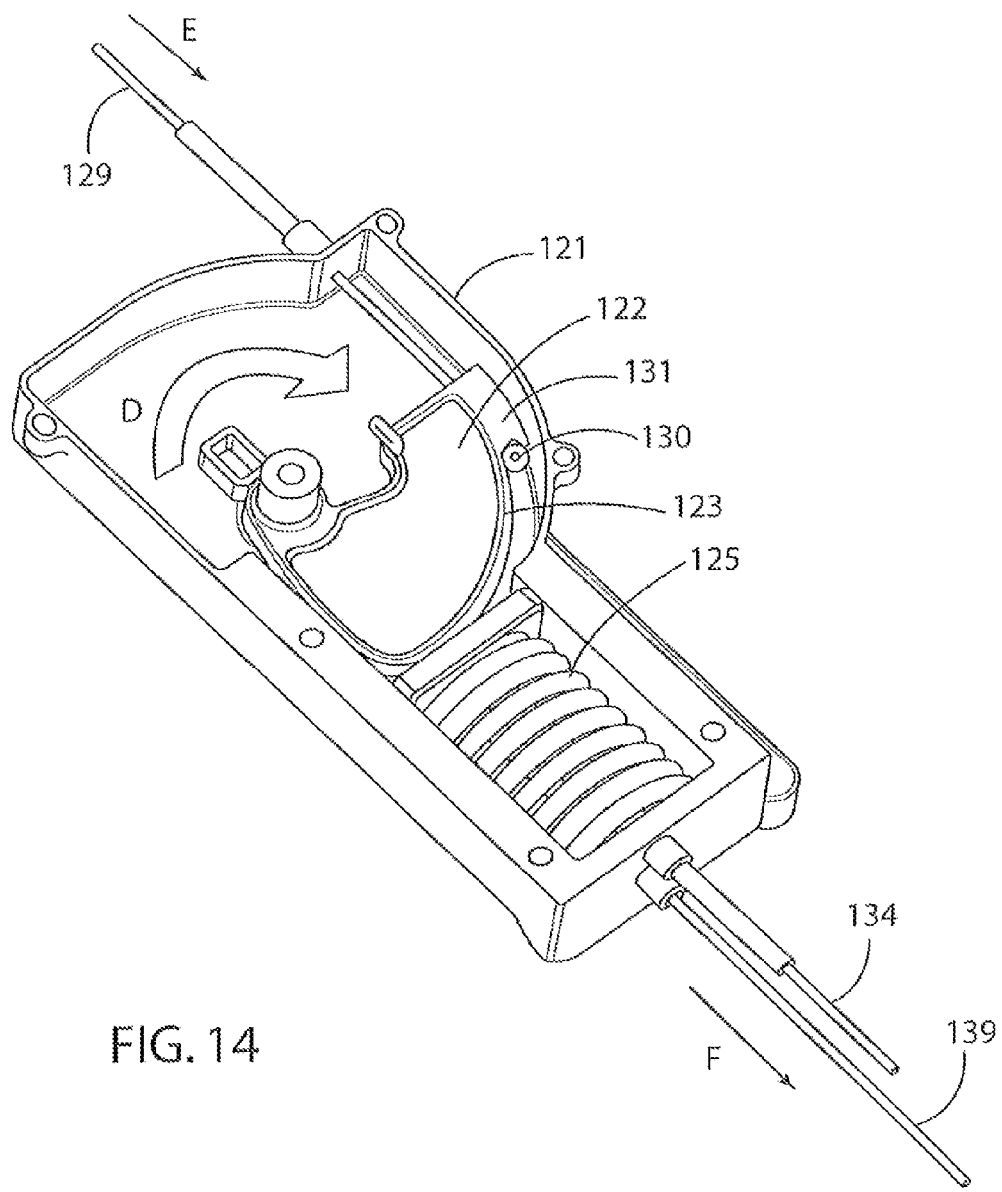
FIG. 14 is an isometric view of the mechanism of FIG. 12.
Figure 15:
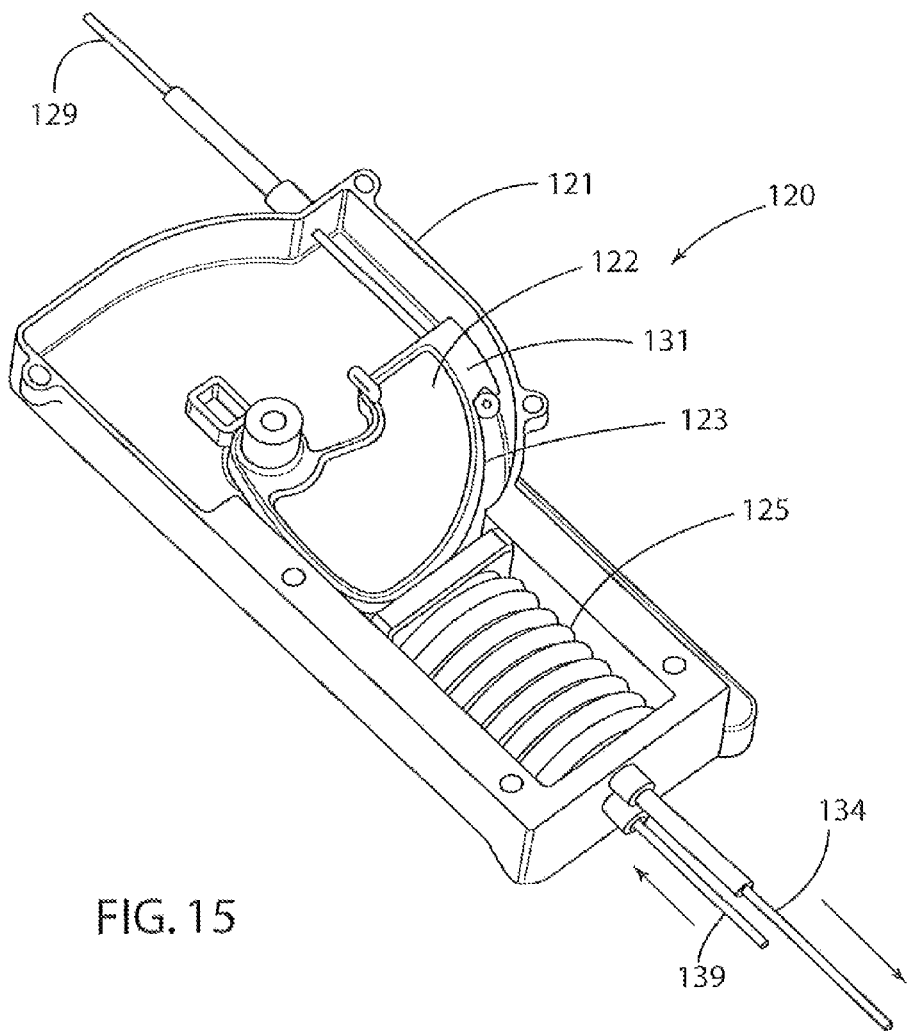
FIG. 15 is an isometric view of the mechanism of FIG. 12.

With reference to FIG. 14, actuation of spring return cable 139 by a force F compresses spring 125, and a torsion spring (not shown) causes cam 122 to rotate in the direction of the arrow D as the spring 125 is compressed. As the cam 122 approaches the start position, ball end 130 of cable 129 engages retainer 131 of cam 122, and causes input cable 129 to shift in the direction of the arrow E. Although mechanism 120 may be utilized in a wide range of application in a wide range of mounting configurations, in one application the spring return cable 139 is grounded to a stationary connector on a vehicle floor or seat frame, and output cable 134 is operably connected to a movable headrest, armrest, "fold flat" seat, or a "tumble" seat. Movement of the headrest, armrest, or seat compresses spring 125 as the seat or other component is moved to a folded position, causing the mechanism 120 to shift from the state shown in FIG. 13 to the state shown in FIG. 14. Conversely, as the seat or other component unfolds, the spring changes from the compressed configuration shown in FIG. 12 to the extended configuration shown in FIG. 13, and the output force generated by the mechanism 120 assists in unfolding the seat or other component. It will be understood that, in general, the seat or other component need not move from a folded condition to an unfolded condition and vice versa, but may merely shift between two different configurations.

Figure 16:
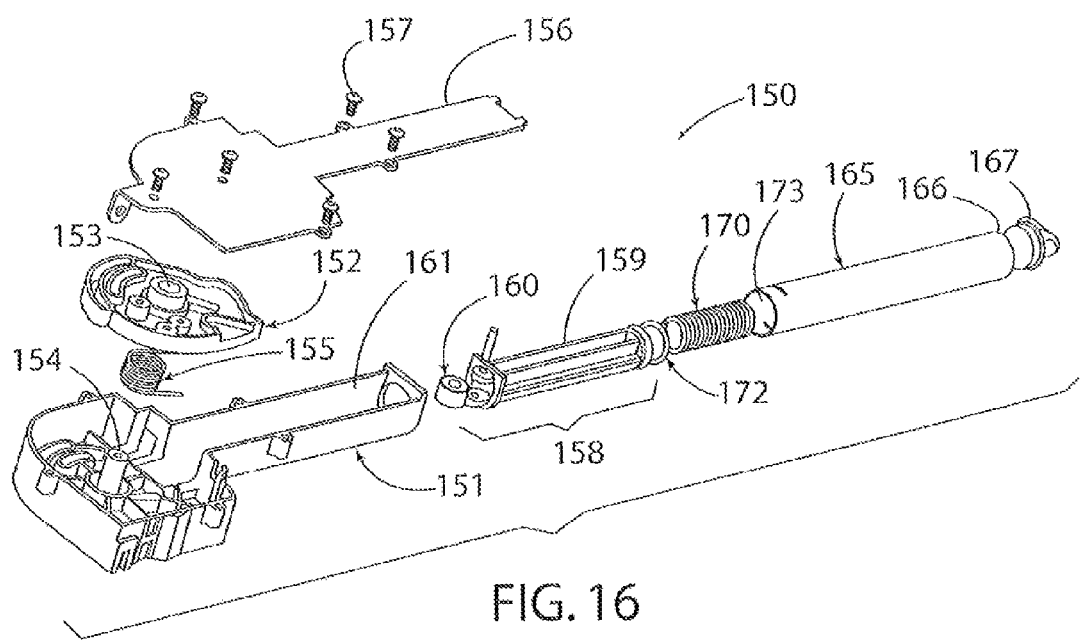
FIG. 16 is an exploded isometric view of an energy storage mechanism according to yet another aspect of the present invention.
Figure 19:
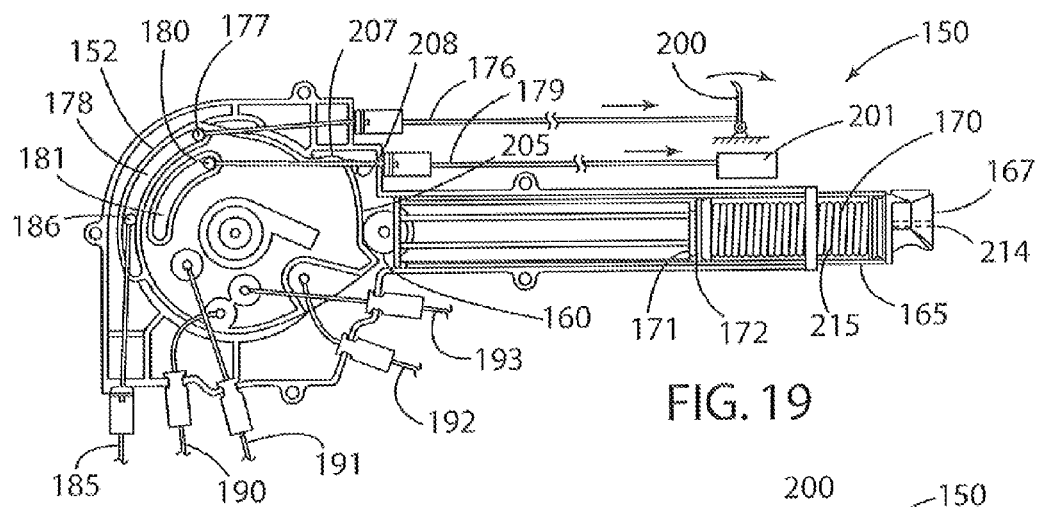
FIG. 19 is a partially schematic side elevational view of the mechanism of FIGS. 16-18 in a retracted position.
Figure 20:
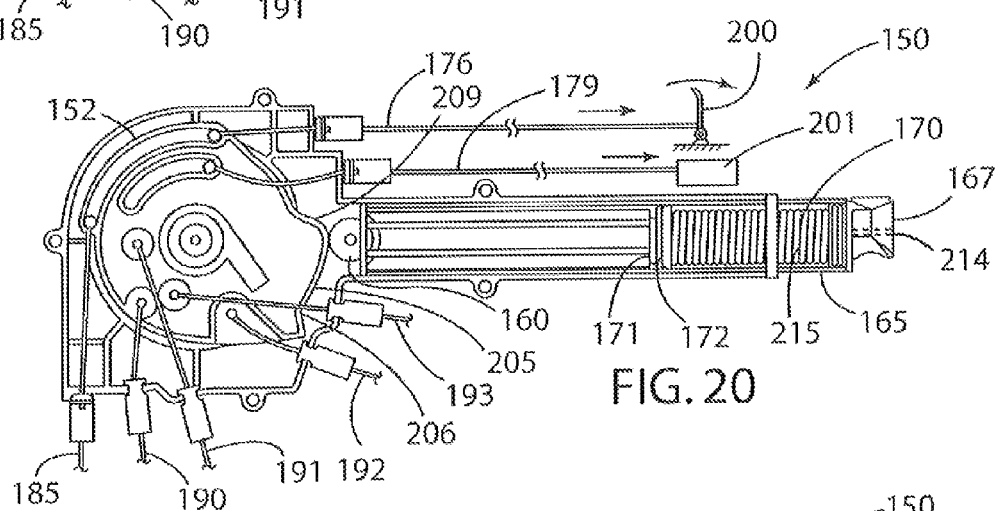
FIG. 20 is a partially schematic view of the mechanism of FIG. 18 immediately prior to release of the cam.
Figure 21:
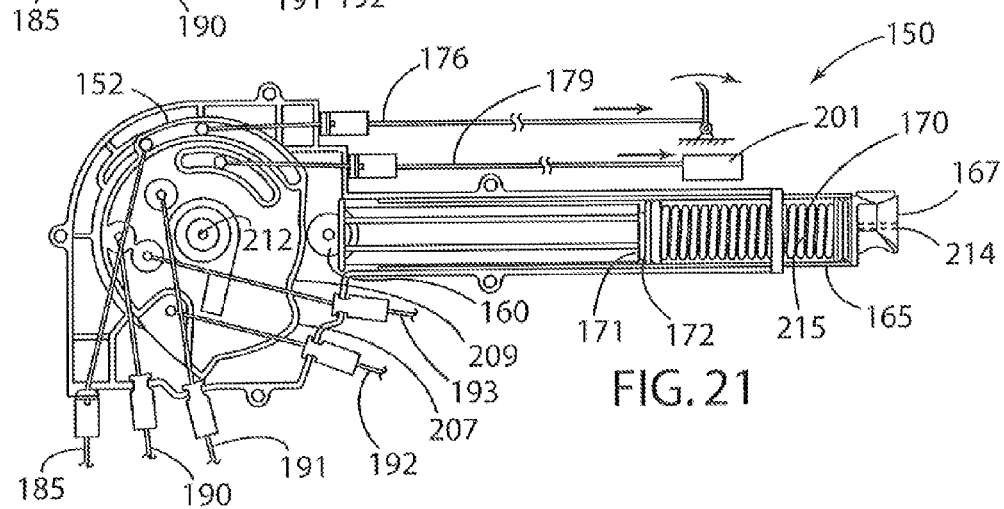
FIG. 21 is a partially schematic side elevational view of the mechanism of FIG. 19 immediately after the cam rotates due to release of the mechanism.

With further reference to FIG. 16, an energy storage mechanism 150 according to yet another aspect of the present invention includes a housing 151, and a cam 152 having an opening 153 that receives a boss 154 of housing 151 when cam 152 is installed in housing 151 to form a pivot 212 (FIG. 21). As described in more detail below, a torsion spring 155 rotatable biases the cam 152 in a counterclockwise direction (when oriented as shown in FIGS. 19-21) relative to housing 151. A cover 156 may be secured to housing 151 utilizing threaded fasteners 157. A cam follower assembly 158 includes an elongated body 159 and a follower wheel 160 that is rotatably mounted to the elongated body 159. An elongated tube 165 includes an outer end 166 to which an end piece 167 is mounted. When assembled, tube 165 is slidably received in elongated portion 161 of housing 151, and elongated body 159 of cam follower assembly 158 is slidably received within tube 165 (see also FIGS. 17 and 18). When assembled, a coil spring 170 contacts outer end 171 of body 159 of cam follower assembly 158, and also contacts end piece 167 fixed to elongated tube 165. The coil spring 170 thereby biases the tube 165 towards an extended position relative to the cam follower assembly 158. An O-ring 172 fits around end 171 of elongated body 159 to secure the O-ring 172 to the elongated body 159. O-ring 172 provides an air-tight, slidable seal between the cam follower assembly 158 and inner surface 173 of tube 165. As described in more detail below, end piece 167 includes a relatively small orifice 214 that controls the flow of air into tube 165 in the region between the end 171 of body 159 and outer end 166 of tube 165. This restriction of air flow limits the rate at which tube 165 will extend relative to cam follower assembly 158 due to the force of coil spring 170.

With further reference to FIGS. 17 and 18, wheel 160 of cam follower assembly 158 rotatably engages cam surface 178 of cam 152. A first release cable 76 includes an end fitting 177 that is received in an arcuate slot 178 of cam 152. Similarly, a second release cable 179 includes an end fitting 180 that is received in an arcuate slot 181 of cam 152. As described in more detail below, the release cables 176 and 179 may be pulled either manually by a release lever 200 or by an electrically powered actuator 201 to rotate cam 152 in a clockwise direction (FIG. 17) to thereby release the mechanism 150.

An interlock cable 185 includes an end fitting 186 that is received in arcuate slot 178 of cam 152. If end fitting 186 engages end 187 of arcuate slot 178, the cable 185 prevents rotation of cam 152 in a clockwise manner that would otherwise occur if a tension force is applied to one or both of the release cables 176 and 179. Interlock cable 185 may be operably connected to the seat back 12 (FIG. 1), such that cable 185 prevents rotation of cam 152 unless the seat back 12 is in the lower position "L". Alternately, the cable 185 may be configured to prevent rotation of cam 152 unless the seat back 12 is sufficiently close to the lower position "L". For example, cable 185 may be operably connected to the seat back 12, such that rotation of cam 152 is prevented unless the seat back 12 is within, for example, thirty degrees or forty-five degrees of the lowermost position "L". As described in more detail below, the interlock cable 185 thereby provides a safety feature to prevent movement of the seat about pivot 16 (FIG. 1) unless the seat back 12 is in the lowermost position "L". Thus, if an object is positioned on the seat 21 such that seat back 12 cannot go to the lowermost position "L", interlock cable 185 prevents release of mechanism 150, and thereby prevents release of release latch mechanism 18.

A plurality of output cables 190, 191, 192, and 193 are connected to the cam 152 at connection points 194, 195, 196, and 197, respectively. As also described in more detail below, rotation of cam 152 in the clockwise direction (FIG. 17) shifts (i.e., pulls) the output cables 190-193 to thereby generate output forces. In the illustrated example, cables 191 and 193 comprise "first stage" cables that move a relatively large distance during the initial rotation of cam 152 from a rest position (FIG. 19) to an intermediate position (FIG. 20). The cables 190 and 192 comprise "second stage" cables that do not move significantly as the cam rotates from the position illustrated in FIG. 19 to the position shown in FIG. 20, but do, however, move significantly as the cam 152 moves from the position shown in FIG. 20 to the position shown in FIG. 21. In the illustrated example, the first stage cables 191 and 193 are utilized to release a conventional pawl and ratchet mechanism 183 (FIGS. 1 and 2) that locks the seat back 12 at a desired angular position about pivot 12 (FIG. 1). The second stage cables 190 and 192 operate to release release latch mechanism 18. In general, seat back 12 may include a pair of pawl and ratchet mechanisms, and each first stage cable 191 and 193 connects to one of the pawl and ratchet mechanisms. Similarly, a pair of latch mechanisms 18 may be utilized to latch the seat base structure to the vehicle floor 17, and each second stage output cable 190 and 192 connects to one of the latch mechanism 18.

It will be understood that the location of the connection points 194-197 on cam 152 control the amount of movement of the output cables 190-193 due to rotation of cam 152. Specifically, connection points 194 and 197 are chosen to provide for a relatively large amount of motion of first stage cables 191 and 193 during the rotation of cam 152 from the "rest" position of FIG. 19 to the position of FIG. 20, yet provide relatively little motion of first stage cables 191 and 193 as cam 152 further rotates from the position of FIG. 20 to the position of FIG. 21. Conversely, the connection points 194 and 196 for second stage output cables 190 and 192, respectively, are selected to provide for relatively small movement of cables 190 and 192 as cam 152 moves from the position of FIG. 19 to the position of FIG. 20, while providing for a relatively large amount of movement of second stage output cables 190 and 192 as cam 152 further rotates from the position of FIG. 20 t the position of FIG. 21.

With further reference to FIG. 19, mechanism 150 is in a "rest" or retracted position when the vehicle seat assembly 10 is in the use position illustrated in FIG. 1. Input or release cable 176 may be operably connected to a release lever or latch 200 that can be manually operated by a user to generate a tension on cable 176. Cable 179 may be connected to an electrical actuator 210 that can be actuated by a user to generate a tension on cable 179. In general, manual release lever 200 provides a back up to permit release of mechanism 150 in the event electrical actuator 201 fails. It will be understood that device 150 may utilize only the manual release lever 200 or it may utilize only the electrical actuator 201. As discussed above, end fitting 186 of interlock cable 185 engages arcuate slot 178 in cam 152. Interlock cable 185 may be operably connected to the seat back 12 (FIG. 1), such that fitting 186 prevents rotation of cam 152 beyond the position illustrated in FIG. 20 unless the seat back 12 is in the lowered position "L" (FIG. 1), or in the event the seat back 12 is not sufficiently close to the lowermost position "L". In the illustrated example, the fitting 186 and interlock cable 185 are configured to permit rotation of the cam 152 from the position illustrated in FIG. 19 to the position illustrated in FIG. 20 even if the seat back 12 is not in the lowermost position "L", yet prevent rotation of cam 152 from the position illustrated in FIG. 20 to the position illustrated in FIG. 21 unless seat back 12 is in the lowermost position "L", or sufficiently close thereto. When cam 152 is in the position illustrated in FIG. 19, first stage output cables 191 and 193 prevent release of the pawl and ratchet mechanisms (not shown) that control rotation of seat back 12 about pivot 13. Also, when cam 152 is in the position illustrated in FIG. 19 (or a position between that of FIGS. 19 and 20), the second stage output cables 190 and 192 do not release the latch mechanisms 18, such that the seat assembly 10 cannot pivot about pivot 16.

As lever 200 is moved through an initial range of movement, cable 176 rotates cam 152 from the position illustrated in FIG. 19 to the position illustrated in FIG. 20, provided interlock cable 185 is configured to permit rotation of cam 152 in this manner. In the illustrated example, end fitting 186 of cable 185 is spaced apart from the end of slot 178 when cam 152 is in the rest position (FIG. 19). Thus, cable 185 does not restrict movement of cam 152 from the position of FIG. 19 to the position of FIG. 20. Powered actuator 201 may be configured to provide for an initial movement of input cable 179 to rotate cam 152 from the position illustrated in FIG. 19 to the position illustrated in FIG. 20. The portion 205 of cam surface 175 between groove 206 and cam lobe peak 207 has a radius that increases slightly, such that wheel 161 of cam follower assembly 158 shifts the cam follower assembly 158 slightly as cam 152 rotates from the position shown in FIG. 19 to the position shown in FIG. 20 to thereby compress coil spring 170 slightly. The force generated by coil spring 170 thereby biases the cam 152 from the position shown in FIG. 20 back to the rest position shown in FIG. 19. Torsion spring 155 is configured to bias cam 152 towards the position illustrated in FIG. 19. Thus, if torsion spring 155 is large enough, cam surface portion 205 may have a constant radius, and torsion spring 155 may provide the sole rotational force biasing cam 152 to the position illustrated in FIG. 19. In use, a user may actuate lever 200 or powered actuator 201 to cause the cam 152 to rotate from the position shown in FIG. 19 to the position shown in FIG. 20. If the user then releases the lever 200 or powered actuator 201, cam 152 will initially rotate form the position shown in FIG. 20 back to the position shown in FIG. 19 due to the bias of torsion spring 155 and/or the bias generated by spring 170 due to wheel 160 contacting cam surface portion 205. In this way, an initial motion of lever 200 or powered actuator 201 can be utilized to release the pawl and ratchet adjustment mechanism 183 (FIGS. 1 and 2) due to motion of first stage cables 191 and 193 to permit rotation of seat back 12 about pivot 13 without releasing latches 18.

If the manual release lever 200 or electrical actuator 201 are further actuated to further move cable 176 and/or cable 179 and thereby rotate cam 152 beyond the position illustrated in FIG. 20 towards the position of FIG. 21, the wheel 160 of cam follower 158 will pass over the cam lobe peak 207. As cam 152 continues to rotate, wheel 160 will travel along cam surface portion 209. The contour of cam surface portion 209 and the line of action of cam follower assembly 158 relative to pivot 212 is configured such that spring 170 generates a relatively large rotational force tending to rotate cam 152 from the position of FIG. 20 to the positions of FIG. 21. Once follower wheel 160 moves past cam lobe peak 207, spring 170 expands, and the force generated by spring 170 causes cam 152 t rotate from the potion shown in FIG. 20 to the position shown in FIG. 21. The rotational force generated by spring 170 on cam 152 when follower wheel engages cam surface portion 209 is substantially greater than the biasing force generated by torsion spring 155, such that cam 152 generates a relatively large force pulling on "second stage" cables 190 and 192 to ensure that cables 190 and 192 release latches 18 and permit upward rotation of the seat assembly. As cam 152 rotates from the position shown in FIG. 20 to the position shown in FIG. 21, the second stage output cables 190 and 192 move significantly, releasing the latch mechanisms 18 to thereby permit movement of the seat assembly from the position shown in FIG. 1 to the position shown in FIG. 2. Cam lobe peak 207 may include a small protrusion or detent 208. Detent 208 provides tactile feedback to a user manipulating lever 200, and helps to ensure that cam 154 is not inadvertently rotated beyond the position shown in FIG. 20 if a user only desires to release the pawl and ratchet mechanisms 183 to permit angular adjustment of seat back 12 about pivot 13. It will be understood that mechanisms 183 may include a torsion spring that biases seat back 12 about pivot 13.

As the cam 152 rotates from the position shown in FIG. 20 to the position of FIG. 21, spring 170 begins to expand, thereby shifting tube 165 outwardly with respect to the other portions of the mechanism 150. Fitting 167 of tube 165 is pivotally connected to fixed structure 15 (FIG. 1) at 39, such that extension of tube 165 relative to the other portions of mechanism 150 is prevented if latches 18 are engaged. However, once the second stage cables 190 and 192 release latches 18, the seat assembly 10 is free to rotate from the position shown in FIG. 1 to the position shown in FIG. 2, and spring 170 continues to expand after cam 152 rotates to the position of FIG. 21, thereby assisting in movement of the seat assembly to the upright position shown in FIG. 2. It will be understood that FIG. 21 shows cam 152 immediately after it rotates to release latches 18, but before spring 170 has fully expanded to extend tube 165 and rotate the seat assembly from the position of FIG. 1 to the position of FIG. 2.

A small orifice 214 through end piece 167 fluidly connects cavity 215 formed by tube 165 and end 171 of body 159 of cam follower 158 due to the sealing action of O-ring 172 on the inner side wall of tube 165. As spring 170 expands and tube 165 extends away from cam follower assembly 158, the volume of the cavity 215 increases. The size of the orifice 214 through end piece 167 is selected to restrict air flow into the cavity 215, thereby providing a damping force that limits the rate at which tube 165 extends due to the forces generated by spring 170.

Referring again to FIGS. 1 and 2, as the seat assembly 10 rotates from the position shown in FIG. 1 to the position shown in FIG. 2, the center of gravity 80 moves over the pivot point 16, such that the weight of the seat assembly 10 assists rotation after center of gravity 80 pass over pivot 16. Also, as the energy stored in coil spring 170 is expended, the seat assembly 10 gains momentum tending to continue rotation of the seat assembly 10 from the position shown in FIG. 1 to the position shown in FIG. 2. As the seat assembly 10 approaches the fully folded position shown in FIG. 2, it generates a tension force tending to pull tube 165 away from the other positions of mechanism 150. This force pulls the spring 170 away from cam follower assembly 158, such that wheel 160 of cam follower assembly 158 is no longer biased into contact with cam 154 by spring 170. At this point, the torsion spring 155 causes the cam to rotate from the position shown in FIG. 21 back to the position shown in FIG. 19 to thereby reset the cam 152. The seat assembly may include on or more torsion springs 188 biasing the seat towards the folded position of FIG. 2. Torsion springs 188 may be utilized to assist the energy storage mechanism, and thereby reduce the size of coil spring 170.

If a user desires to move the seat assembly 10 from the upright position shown in FIG. 2 back to the use position shown in FIG. 1, a user manually applies a force on the seat assembly 10 causing the seat assembly 10 to rotate back to the position shown in FIG. 1. As the seat assembly 10 is rotated to the use position, the tube 165 is pushed inwardly until it returns to the fully retracted position illustrated in FIG. 19. Once the seat assembly 10 is fully rotated to the use position shown in FIG. 1, the latches 18 are engaged to thereby retain the seat assembly 10 in the use position shown in FIG. 1.

Energy storage mechanism 150 may be configured to generate forces during operation as shown in FIG. 9 and described in more detail above in connection with mechanism 1.

The energy storage mechanism of the present invention permits a folding seat to be operated by manipulation of a single release mechanism, lever, or the like. Also, as described above, the mechanism of the present invention provides for a relatively small release force and release motion, yet the output of the mechanism is a relatively large force acting over a relatively large movement. A mechanism according to the present invention thereby provides a cost-effective way to provide mechanical assistance in a folding seat, without requiring multiple inputs by a user and/or high input forces and/or large movements by a user.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A folding seat assembly for motor vehicles, comprising:
   a support structure;
   a seat base pivotably connected to the support structure for movement between a use position and non-use position, the seat base defining a generally upwardly-facing seating surface;
   at least one latch that releasably secures the seat base to the support structure and selectively retains the seat base in the use position;
   a generally upright seat back pivotably connected to the seat base;
   an energy storage mechanism comprising:
   a housing connected to one of the support structure and the seat base;
   an elongated output member slidably connected to the housing for reciprocating motion relative to the housing, wherein the output member is connected to the other of the support structure and the seat base such that the output member moves between extended and retracted positions relative to the housing upon movement of the seat base relative to the support structure;
   a cam rotatably mounted to the housing for rotation between a rest position and an actuated position and including a cam surface;
   a cam follower engaging the cam surface such that the cam follower moves relative to the housing upon rotation of the cam;
   a spring operably engaging the cam follower and the output member and biasing the output member towards the extended position, and rotatably biasing the cam towards the actuated position;
   a torsion spring biasing the cam towards the rest position;
   a release cable operably connected to the cam and operable to rotate the cam from the rest position towards the actuated position upon movement of the release cable;
   an output cable operably interconnecting the cam and the latch such that the latch is released upon movement of the cam to the actuated position.

2. The folding seat assembly of claim 1, wherein:
   the output cable comprises a first output cable; and including:
   a releasable adjustment mechanism retaining the seat back at a user-selected angular position;

a second output cable operably connecting the cam to the releasable adjustment mechanism such that movement of the cam releases the adjustment mechanism to permit pivoting movement of the seat back.

3. The folding seat assembly of claim 2, wherein:
the cam defines an intermediate position between the rest position and the actuated position; and wherein:
the cam moves the second output cable and releases the adjustment mechanism upon movement of the cam from the rest position to the intermediate position, and the cam moves the first output cable and releases the latch upon movement of the cam from the intermediate position to the actuated position.

4. The folding seat assembly of claim 3, wherein:
the cam surface includes a first portion that is engaged by the cam follower when the cam is between the rest position and the intermediate position, and a second portion that is engaged by the cam follower when the cam is between the intermediate position and the actuated position;
the second portion of the cam surface is configured such that the spring and the cam follower rotatably bias the cam towards the actuated position with sufficient force to overcome the bias of the torsion spring when the cam follower engages the second portion of the cam surface and generate a tension force on the first output cable sufficient to release the latch.

5. The folding seat assembly of claim 4, wherein:
the first portion of the cam surface is configured such that the spring and the cam follower do not generate sufficient force to overcome the bias of the torsion spring when the cam follower engages the first portion of the cam surface, such that the cam rotates from the rest position to the intermediate position upon application of a tensioning force to the release cable, and rotates from the intermediate position back to the rest position upon release of the tensioning force.

6. The folding seat assembly of claim 3, wherein:
the seat back pivots between a generally upright use position wherein the seat back is generally transverse to the seating surface, and a folded position wherein at least a portion of the seat back is directly adjacent the seating surface; and including:
an interlock cable operably connected to the seat back and to the cam and preventing movement of the cam from the intermediate position to the actuated position unless the seat back is positioned at least about halfway between the use position and the folded position.

7. The folding seat assembly of claim 1, wherein:
the output member comprises a tube;
the cam follower includes an elongated body portion slidably received within the tube.

8. The folding seat assembly of claim 7, wherein:
the cam follower forms a substantially air tight seal with the tube to define an internal cavity space within the tube, and wherein the volume of the internal cavity space changes upon movement of the cam follower relative to the tube;
the tube including an orifice fluidly connecting the internal cavity space to ambient space where air moves through the orifice upon movement of the cam follower relative to the tube to thereby dampen movement of the cam follower relative to the tube.

9. The folding seat assembly of claim 8, wherein:
the tube has an inner end surface;
the spring is disposed within the tube and extends between an end of the elongated body portion of the cam follower and the inner end surface of the tube.

10. The folding seat assembly of claim 1, including:
a release member operably connected to the release cable such that movement of the release member moves the release cable and rotates the cam.

11. The folding seat assembly of claim 10, wherein:
the release cable comprises a first release cable; and including:
a second release cable operably connected to the cam;
a powered actuator connected to the second release cable.

12. The folding seat assembly of claim 1, including:
an interlock cable operably connected to the cam and selectively restricting movement of the cam upon application of a force to the release cable.

13. The folding seat assembly of claim 12, wherein:
the seat back defines an angular position relative to the seat base; and
the interlock cable is operably connected to the seat back and prevents rotation of the cam to the actuated position based upon the angular position of the seat back relative to the seat base.

14. The folding seat assembly of claim 1, including:
a powered actuator connected to the release cable and operable to move the release cable to thereby rotate the cam.

15. A seat assembly, comprising:
a support structure;
a seat assembly movably connected to the support structure for movement between a first position and a second position relative to the support structure;
at least one latch releasably retaining the seat assembly in the first position;
an energy storage mechanism having a first member connected to a selected one of the support structure and the seat assembly, and an output member movably interconnected to the first member, and wherein the output member is connected to the other of the support structure and the seat assembly such that the output member moves relative to the first member upon movement of the seat assembly relative to the support structure;
the energy storage mechanism including a movable cam that is operably connected to the latch and selectively releases the latch upon movement of the cam;
the energy storage mechanism further including a resilient member operably engaging the cam and generating a biasing force tending to move the output member relative to the first member in a manner tending to move the seat assembly from the first position to the second position, the resilient member further biasing the cam in a manner that tends to cause movement of the cam in a manner that causes the cam to release the latch.

16. The seat assembly of claim 15, wherein:
the seat assembly is pivotably connected to the support structure.

17. The seat assembly of claim 15, wherein:
the seat assembly includes a seat base pivotably connected to the support structure for movement between a use position and a non-use position, the seat assembly further including a generally upright seat back pivotably connected to the seat base.

18. The seat assembly of claim 17, wherein:
the output member is movable between extended and retracted positions;
the cam is rotatable between a rest position and an actuated position, the cam defining a cam surface;

the energy storage mechanism includes a cam follower engaging the cam surface;

the resilient member comprises a spring operably engaging the cam follower and biasing the output member towards the extended position and rotatably biasing the cam towards the actuated position.

19. The seat assembly of claim 18, including:

a torsion spring biasing the cam towards the actuated position.

20. The seat assembly of claim 19, including:

an output cable operably interconnecting the cam and the latch such that the latch is released upon movement of the cam to the actuated position.

21. The seat assembly of claim 20, wherein:

the output cable comprises a first output cable; and including:

a releasable adjustment mechanism retaining the seat back at a user-selected angular position;

a second output cable operably connecting the cam to the releasable adjustment mechanism such that movement of the cam releases the adjustment mechanism to permit pivoting movement of the seat back.

22. The seat assembly of claim 21, wherein:

the cam defines an intermediate position between the rest position and the actuated position; and wherein:

the cam moves the second output cable and releases the adjustment mechanism upon movement of the cam from the rest position to the intermediate position, and the cam moves the first output cable and releases the latch upon movement of the cam from the intermediate position to the actuated position.

23. The seat assembly of claim 22, wherein:

the cam surface includes a first portion that is engaged by the cam follower when the cam is between the rest position and the intermediate position, and a second portion that is engaged by the cam follower when the cam is between the intermediate position and the actuated position;

the second portion of the cam surface is configured such that the spring and the cam follower rotatably bias the cam towards the actuated position with sufficient force to overcome the bias of the torsion spring when the cam follower engages the second portion of the cam surface and generate a tension force on the first output cable sufficient to release the latch.

24. The seat assembly of claim 23, wherein:

the first portion of the cam surface is configured such that the spring and the cam follower do not generate sufficient force to overcome the bias of the torsion spring when the cam follower engages the first portion of the cam surface, such that the cam rotates from the rest position to the intermediate position upon application of a tensioning force to the release cable, and rotates from the intermediate position back to the rest position upon release of the tensioning force.

\* \* \* \* \*

UNITED STATES PATENT AND TRADEMARK OFFICE
CERTIFICATE OF CORRECTION

| | | |
|---|---|---|
| PATENT NO. | : 7,631,938 B2 | |
| APPLICATION NO. | : 11/843422 | |
| DATED | : December 15, 2009 | |
| INVENTOR(S) | : Tomandl | |

It is certified that error appears in the above-identified patent and that said Letters Patent is hereby corrected as shown below:

Column 2
Line 60, "sue" should be -- use --.

Column 3
Line 13, "pivotable" should be -- pivotably --.
Line 42, "(Fig 1)" should be -- (Fig. 1) --.

Column 4
Line 7, "operation , elongated" should be -- operation, elongated --.
Line 19, "in a aperture" should be -- in an aperture --.
Line 39, "pivotable" should be -- pivotably --.
Line 62, "can 5" should be -- cam 5 --.

Column 5
Line 13, "suer" should be -- user --.
Line 16, "58" should be -- 68 --.
Line 20, "moveable" should be -- movable --.

Column 6
Line 67, "(Fig 2.)" should be -- (Fig. 2) --.

Column 7
Line 38, "A the" should be -- As the --.
Line 46, "(Fig 4)" should be -- (Fig. 4) --.

Column 8
Line 64, "pivotable" should be -- pivotably --.

Signed and Sealed this
First Day of March, 2011

David J. Kappos
*Director of the United States Patent and Trademark Office*

CERTIFICATE OF CORRECTION (continued)
U.S. Pat. No. 7,631,938 B2

Column 9
Line 48, "application" should be -- applications --.

Column 10
Line 5, "rotatable" should be -- rotatably --.
Line 11, "end 16 6" should be -- end 166 --.
Line 32, "cable 76" should be -- cable 176 --.

Column 11
Line 12, "pivot 12" should be -- pivot 13 --.
Line 37, "Fig. 20 t the" should be -- Fig. 20 to the --.
Line 44, "actuator 210" should be -- actuator 201 --.

Column 12
Line 34, "form" should be -- from --.
Line 53, "positions" should be -- position --.
Line 56, "cam 152 t rotate...the potion" should be -- cam 152 to rotate...the position --.

Column 13
Line 42, "pass" should be -- passes --.
Line 49, "positions" should be -- portions --.
Line 55, "on or more" should be -- one or more --.